US012760747B2

(12) United States Patent
Suzuki

(10) Patent No.: US 12,760,747 B2
(45) Date of Patent: Oct. 13, 2026

(54) VACUUM PUMP

(71) Applicant: Edwards Japan Limited, Yachiyo (JP)

(72) Inventor: Haruki Suzuki, Yachiyo (JP)

(73) Assignee: Edwards Japan Limited, Yachiyo (JP)

( * ) Notice: Subject to any disclaimer, the term of this patent is extended or adjusted under 35 U.S.C. 154(b) by 0 days.

(21) Appl. No.: 18/546,373

(22) PCT Filed: Feb. 25, 2022

(86) PCT No.: PCT/JP2022/007938

§ 371 (c)(1),
(2) Date: Aug. 14, 2023

(87) PCT Pub. No.: WO2022/186075

PCT Pub. Date: Sep. 9, 2022

(65) Prior Publication Data

US 2024/0117816 A1 Apr. 11, 2024

(30) Foreign Application Priority Data

Mar. 4, 2021 (JP) ................................ 2021-034156

(51) Int. Cl.
*F04D 29/52* (2006.01)
*F04D 19/04* (2006.01)
*F04D 29/58* (2006.01)

(52) U.S. Cl.
CPC ........... *F04D 29/522* (2013.01); *F04D 19/04* (2013.01); *F04D 29/584* (2013.01); *F04D 29/5853* (2013.01); *F05D 2260/607* (2013.01)

(58) Field of Classification Search
CPC ...... F04D 19/04; F04D 19/042; F04D 19/044; F04D 19/046; F04D 19/048;
(Continued)

(56) References Cited

U.S. PATENT DOCUMENTS 9,347,463 B2 5/2016 Tsutsui
2004/0156713 A1* 8/2004 Watz .................... F04D 29/601 415/175
(Continued)

FOREIGN PATENT DOCUMENTS

CN 103671138 A 3/2014
CN 106460856 A 2/2017
(Continued)

OTHER PUBLICATIONS

English machine translation of JP-2003-278691-A, Feb. 7, 2025.*
(Continued)

*Primary Examiner* — Courtney D Heinle
(74) *Attorney, Agent, or Firm* — Shumaker & Sieffert, P.A.

(57) ABSTRACT

A vacuum pump that limits accumulation of deposits while providing a satisfactory permissible flow rate is obtained. The vacuum pump includes a rotor, a plurality of stator portions that are disposed facing the rotor and have a gas compression function, and a reference member 301 that is one of members stacked toward an inlet port 101 from a base portion 129 and serves as a reference in an axial direction for the plurality of stator portions. The plurality of stator portions are disposed downstream of the reference member 301 (the side corresponding to the outlet port 133).

11 Claims, 10 Drawing Sheets

(58) Field of Classification Search
CPC ............... F04D 29/584; F04D 29/5846; F04D 29/5853; F05D 2260/607
See application file for complete search history.

(56) References Cited

U.S. PATENT DOCUMENTS

| | | | | |
|---|---|---|---|---|
| 2011/0103934 | A1* | 5/2011 | Ohtachi | F04D 19/042 415/118 |
| 2014/0072417 | A1 | 3/2014 | Tsutsui | |
| 2014/0241853 | A1* | 8/2014 | Schill | F04D 29/584 415/1 |
| 2015/0086328 | A1* | 3/2015 | Tsutsui | F04D 19/042 415/47 |
| 2015/0219116 | A1* | 8/2015 | Tsutsui | F04D 29/584 415/175 |
| 2015/0226229 | A1 | 8/2015 | Tsutsui | |
| 2016/0298649 | A1 | 10/2016 | Hölzer | |
| 2017/0108008 | A1 | 4/2017 | Sakaguchi et al. | |
| 2018/0335052 | A1* | 11/2018 | Sakaguchi | F04D 29/584 |
| 2022/0397124 | A1* | 12/2022 | Takai | F04D 19/042 |
| 2022/0412369 | A1* | 12/2022 | Miwata | F04D 19/044 |
| 2024/0254994 | A1* | 8/2024 | Sakaguchi | F04D 27/006 |

FOREIGN PATENT DOCUMENTS

| | | | |
|---|---|---|---|
| EP | 3779202 | A1 | 2/2021 |
| JP | H1162879 | A | 3/1999 |
| JP | H11201083 | A | 7/1999 |
| JP | 2001082379 | A | 3/2001 |
| JP | 2003148380 | A | 5/2003 |
| JP | 2003-278691 | A * | 10/2003 |
| JP | 4503947 | B2 | 7/2010 |
| JP | 2019090398 | A | 6/2019 |
| WO | 2014045438 | A1 | 3/2014 |

OTHER PUBLICATIONS

International Search Report and Written Opinion of International Application No. PCT/JP2022/007938, dated Apr. 26, 2022, 9 Pages.
Extended Search Report from counterpart European Application No. 22763131.4 dated Dec. 9, 2024, 7 pp.
First Office Action and Search Report, and translation thereof, from counterpart Chinese Application No. 202280014833.6 dated Jul. 25, 2026, 14 pp.

* cited by examiner

VACUUM PUMP

This application is a U.S. national phase application under 35 U.S.C. § 371 of international application number PCT/JP2022/007938 filed on Feb. 25, 2022, which claims the benefit of JP application number 2021-034156 filed on Mar. 4, 2021.

TECHNICAL FIELD

The present disclosure relates to a vacuum pump.

BACKGROUND

In some vacuum pumps, a stator of a thread groove pump portion and stator blades (stator) of a turbomolecular pump portion are sequentially stacked toward the suction side in an axial direction with respect to a base portion. Also, in some vacuum pumps, a base portion extends to the outer circumference surface and is cooled by a cooling pipe. (see PTL 1, for example). [PTL 1] Japanese Patent Application Publication No. 2014-51952.

SUMMARY

Generally, in a multi-stage configuration having a plurality of pump portions connected in series, such as the turbomolecular pump portion and the thread groove pump portion described above, the pump portion (the thread groove pump portion in the vacuum pump described above) of the latter stage has a high pressure. It is thus preferable to increase the temperature of the latter pump portion to limit accumulation of gas deposits, for example. However, when the temperature of the latter pump portion becomes excessively high, the heat dissipation of the prior pump portion (the rotor blades of the turbomolecular pump portion) is hindered, lowering the permissible gas flow rate.

It is an object of the present disclosure to obtain a vacuum pump that limits accumulation of deposits and also provides a satisfactory permissible flow rate.

A vacuum pump according to the present disclosure includes: a casing including an inlet port; a base portion; a rotor rotationally held in the casing; a plurality of stator portions that are disposed facing the rotor and have a gas compression function; and a reference member that is one of members stacked toward the inlet port from the base portion and serves as a reference in an axial direction for the stator portions, and at least two of the plurality of stator portions are disposed downstream of the reference member.

According to the present disclosure, it is possible to obtain a vacuum pump that limits accumulation of deposits while providing a satisfactory permissible flow rate.

The above and other objects, features, and advantages of the present disclosure will become further apparent from the following detailed description together with the accompanying drawings.

DETAILED DESCRIPTION

Figure 1:
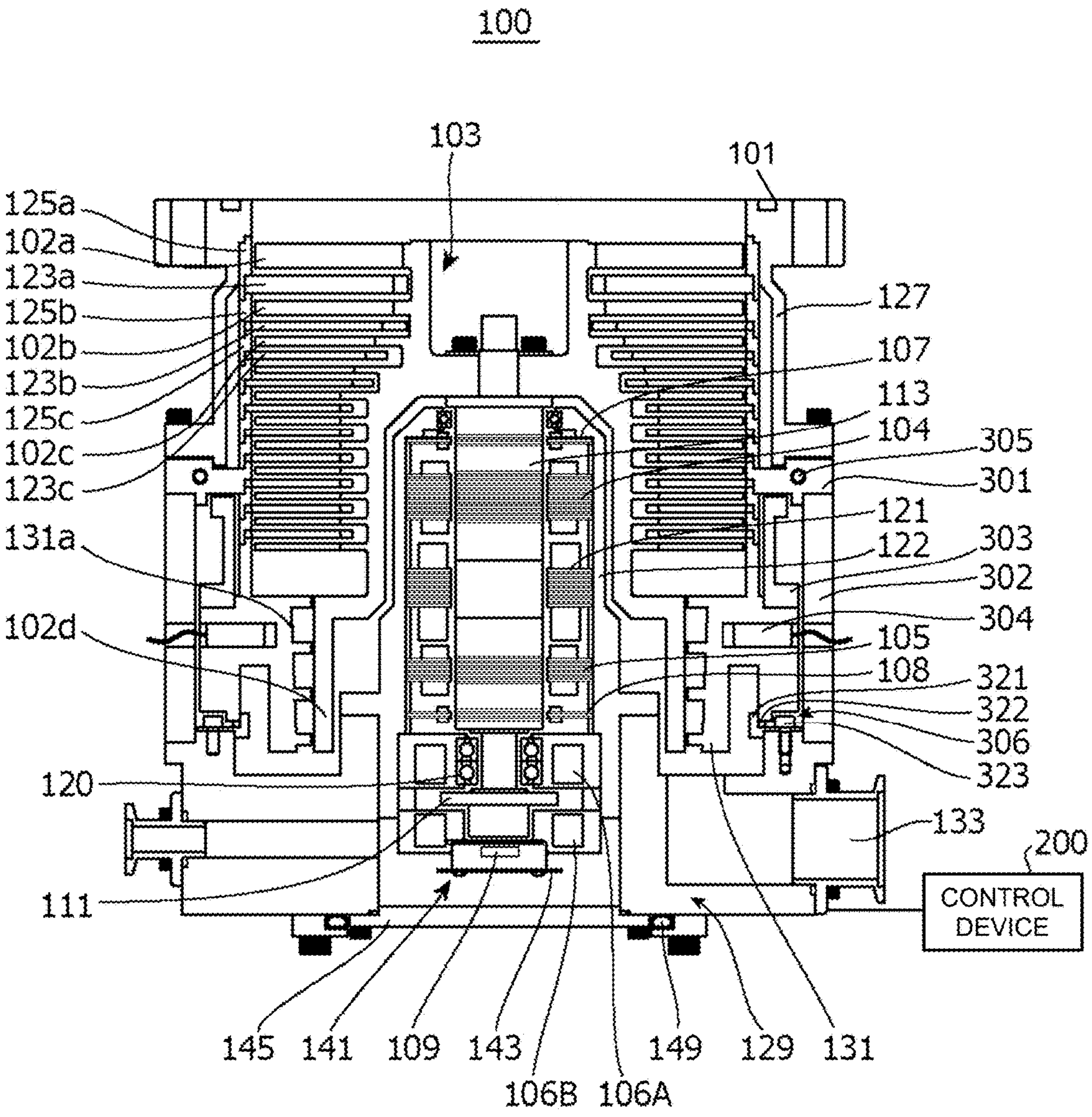
FIG. 1 is a longitudinal cross-sectional view showing a turbomolecular pump as a vacuum pump according to an example of the present disclosure.

Referring to the drawings, examples of the present disclosure are now described.

First Example

FIG. 1 is a longitudinal cross-sectional view of a turbomolecular pump 100. As shown in FIG. 1, the turbomolecular pump 100 has a circular outer cylinder 127 having an inlet port 101 at its upper end. A rotating body 103 in the outer cylinder 127 includes a plurality of rotor blades 102 (102*a*, 102*b*, 102*c*, . . . ), which are turbine blades for gas suction and exhaustion, in its outer circumference section. The rotor blades 102 extend radially in multiple stages. The rotating body 103 has a rotor shaft 113 in its center. The rotor shaft 113 is supported and suspended in the air and position-controlled by a magnetic bearing of 5-axis control, for example. The rotating body 103 is typically made of a metal such as aluminum or an aluminum alloy.

Upper radial electromagnets 104 include four electromagnets arranged in pairs on an X-axis and a Y-axis. Four upper radial sensors 107 are provided in close proximity to the upper radial electromagnets 104 and associated with the respective upper radial electromagnets 104. Each upper radial sensor 107 may be an inductance sensor or an eddy current sensor having a conduction winding, for example, and detects a position of the rotor shaft 113 based on a change in the inductance of the conduction winding, which changes according to the position of the rotor shaft 113. The upper radial sensors 107 are configured to detect a radial displacement of the rotor shaft 113, that is, the rotating body 103 fixed to the rotor shaft 113, and send it to the control device 200.

In the control device 200, for example, a compensation circuit having a PID adjustment function generates an excitation control command signal for the upper radial electromagnets 104 based on a position signal detected by the upper radial sensors 107. Based on this excitation control command signal, an amplifier circuit 150 (described below) shown in FIG. 2 controls and excites the upper radial electromagnets 104 to adjust a radial position of an upper part of the rotor shaft 113.

The rotor shaft 113 may be made of a high magnetic permeability material (such as iron and stainless steel) and is configured to be attracted by magnetic forces of the upper radial electromagnets 104. The adjustment is performed independently in the X-axis direction and the Y-axis direction. Lower radial electromagnets 105 and lower radial sensors 108 are arranged in a similar manner as the upper radial electromagnets 104 and the upper radial sensors 107 to adjust the radial position of the lower part of the rotor shaft 113 in a similar manner as the radial position of the upper part.

Additionally, axial electromagnets 106A and 106B are arranged so as to vertically sandwich a metal disc 111, which has a shape of a circular disc and is provided in the lower part of the rotor shaft 113. The metal disc 111 is made of a high magnetic permeability material such as iron. An axial sensor 109 is provided to detect an axial displacement of the rotor shaft 113 and send an axial position signal to the control device 200.

In the control device 200, the compensation circuit having the PID adjustment function may generate an excitation control command signal for each of the axial electromagnets 106A and 106B based on the signal on the axial position detected by the axial sensor 109. Based on these excitation control command signals, the amplifier circuit 150 controls and excites the axial electromagnets 106A and 106B separately so that the axial electromagnet 106A magnetically attracts the metal disc 111 upward and the axial electromagnet 106B attracts the metal disc 111 downward. The axial position of the rotor shaft 113 is thus adjusted.

As described above, the control device 200 appropriately adjusts the magnetic forces exerted by the axial electromagnets 106A and 106B on the metal disc 111, magnetically levitates the rotor shaft 113 in the axial direction, and suspends the rotor shaft 113 in the air in a non-contact manner. The amplifier circuit 150, which controls and excites the upper radial electromagnets 104, the lower radial electromagnets 105, and the axial electromagnets 106A and 106B, is described below.

The motor 121 includes a plurality of magnetic poles circumferentially arranged to surround the rotor shaft 113. Each magnetic pole is controlled by the control device 200 so as to drive and rotate the rotor shaft 113 via an electromagnetic force acting between the magnetic pole and the rotor shaft 113. The motor 121 also includes a rotational speed sensor (not shown), such as a Hall element, a resolver, or an encoder, and the rotational speed of the rotor shaft 113 is detected based on a detection signal of the rotational speed sensor.

Furthermore, a phase sensor (not shown) is attached adjacent to the lower radial sensors 108 to detect the phase of rotation of the rotor shaft 113. The control device 200 detects the position of the magnetic poles using both detection signals of the phase sensor and the rotational speed sensor.

A plurality of stator blades 123 (123*a*, 123*b*, 123*c*, . . . ) are arranged slightly spaced apart from the rotor blades 102 (102*a*, 102*b*, 102*c*, . . . ). Each rotor blade 102 (102*a*, 102*b*, 102*c*, . . . ) is inclined by a predetermined angle from a plane perpendicular to the axis of the rotor shaft 113 in order to transfer exhaust gas molecules downward through collision. The stator blades 123 (123*a*, 123*b*, 123*c*, . . . ) are made of a metal such as aluminum, iron, stainless steel, copper, or a metal such as an alloy containing these metals as components.

The stator blades 123 are also inclined by a predetermined angle from a plane perpendicular to the axis of the rotor shaft 113. The stator blades 123 extend inward of the outer cylinder 127 and alternate with the stages of the rotor blades 102. The outer circumference ends of the stator blades 123 are inserted between and thus supported by a plurality of layered stator blade spacers 125 (125*a*, 125*b*, 125*c*, . . . ).

The stator blade spacers 125 are ring-shaped members made of a metal, such as aluminum, iron, stainless steel, or copper, or an alloy containing these metals as components, for example. The outer cylinder 127, a reference member 301, and an outer cylinder member 302 are fixed to the outer circumference of the stator blade spacers 125 with a gap. A base portion 129 is located at the base of the outer cylinder member 302. An outlet port 133 is located above the base portion 129 and communicates with the outside. The exhaust gas transferred through the inlet port 101 from a chamber (vacuum chamber) is sent to the outlet port 133.

According to the application of the turbomolecular pump 100, a threaded spacer 131 may be provided between the lower part of the stator blade spacer 125 and the base portion 129. The threaded spacer 131 is a cylindrical member made of a metal such as aluminum, copper, stainless steel, or iron, or an alloy containing these metals as components. The threaded spacer 131 has a plurality of helical thread grooves 131*a* engraved in its inner circumference surface. When exhaust gas molecules move in the rotation direction of the rotating body 103, these molecules are transferred toward the outlet port 133 in the direction of the helix of the thread grooves 131*a*. In the lowermost section of the rotating body 103 below the rotor blades 102 (102*a*, 102*b*, 102*c*, . . . ), a cylindrical portion 102*d* extends downward. The outer circumference surface of the cylindrical portion 102*d* is cylindrical and projects toward the inner circumference surface of the threaded spacer 131. The outer circumference surface is adjacent to but separated from the inner circumference surface of the threaded spacer 131 by a predetermined gap. The exhaust gas transferred to the thread groove 131*a* by the rotor blades 102 and the stator blades 123 is guided by the thread groove 131*a* to the base portion 129.

The base portion 129 is a disc-shaped member forming the base section of the turbomolecular pump 100, and is generally made of a metal such as iron, aluminum, or stainless steel. The base portion 129 physically holds the turbomolecular pump 100 and also serves as a heat conduction passage. As such, the base portion 129 is preferably made of rigid metal with high thermal conductivity, such as iron, aluminum, or copper.

In this configuration, when the motor 121 drives and rotates the rotor blades 102 together with the rotor shaft 113, the interaction between the rotor blades 102 and the stator blades 123 causes the suction of exhaust gas from the chamber through the inlet port 101. The rotational speed of the rotor blades 102 is usually 20000 rpm to 90000 rpm, and the circumferential speed at the tip of a rotor blade 102 reaches 200 m/s to 400 m/s. The exhaust gas taken through the inlet port 101 moves between the rotor blades 102 and the stator blades 123 and is transferred to the base portion 129. At this time, factors such as the friction heat generated when the exhaust gas comes into contact with the rotor blades 102 and the conduction of heat generated by the motor 121 increase the temperature of the rotor blades 102. This heat is transferred to the stator blades 123 through radiation or conduction via gas molecules of the exhaust gas, for example.

The stator blade spacers 125 are joined to each other at the outer circumference portion and conduct the heat received by the stator blades 123 from the rotor blades 102, the friction heat generated when the exhaust gas comes into contact with the stator blades 123, and the like to the outside.

In the above description, the threaded spacer 131 is provided at the outer circumference of the cylindrical portion 102_d_ of the rotating body 103, and the thread grooves 131_a_ are engraved in the inner circumference surface of the threaded spacer 131. However, conversely, thread grooves may be engraved in the outer circumference surface of the cylindrical portion 102_d_, while a spacer having a cylindrical inner circumference surface may be arranged around the outer circumference surface.

According to the application of the turbomolecular pump 100, to prevent the gas drawn through the inlet port 101 from entering an electrical portion, which includes the upper radial electromagnets 104, the upper radial sensors 107, the motor 121, the lower radial electromagnets 105, the lower radial sensors 108, the axial electromagnets 106A, 106B, and the axial sensor 109, the electrical portion may be surrounded by a stator column 122. In some cases, the inside of the stator column 122 is maintained at a predetermined pressure by purge gas.

In this case, piping (not illustrated) is provided in the base portion 129 to introduce the purge gas through this pipe. The introduced purge gas is sent to the outlet port 133 through gaps between a protective bearing 120 and the rotor shaft 113, between the rotor and the stator of the motor 121, and between the stator column 122 and the inner circumference cylindrical portion of the rotor blade 102.

The turbomolecular pump 100 sets the identification of the model and control based on individually adjusted unique parameters (for example, various characteristics associated with the model). To store these control parameters, the turbomolecular pump 100 includes an electronic circuit portion 141 in its main body. The electronic circuit portion 141 may include a semiconductor memory, such as an EEPROM, electronic components such as semiconductor elements for accessing the semiconductor memory, and a substrate 143 for mounting these components. The electronic circuit portion 141 is housed under a rotational speed sensor (not shown) near the center, for example, of the base portion 129, which forms the lower part of the turbomolecular pump 100, and is closed by an airtight bottom lid 145.

Some process gas introduced into the chamber in the manufacturing process of semiconductors has the property of becoming solid when its pressure becomes higher than a predetermined value or its temperature becomes lower than a predetermined value. In the turbomolecular pump 100, the pressure of the exhaust gas is lowest at the inlet port 101 and highest at the outlet port 133. When the pressure of the process gas increases beyond a predetermined value or its temperature decreases below a predetermined value while the process gas is being transferred from the inlet port 101 to the outlet port 133, the process gas is solidified and adheres and accumulates on the inner side of the turbomolecular pump 100.

For example, when $SiCl_4$ is used as the process gas in an Al etching apparatus, according to the vapor pressure curve, a solid product (for example, $AlCl_3$) is deposited at a low vacuum (760 [torr] to $10^{-2}$ [torr]) and a low temperature (about 20 [° C.]) and adheres and accumulates on the inner side of the turbomolecular pump 100. When the deposits of the process gas accumulates in the turbomolecular pump 100, the accumulation may narrow the pump flow passage and degrade the performance of the turbomolecular pump 100. The above-mentioned product tends to solidify and adhere in areas with higher pressures, such as the vicinity of the outlet port 133 and the vicinity of the threaded spacer 131.

In some examples, conventionally, a heater (not illustrated) or annular water-cooled tube 149 is wound around the outer circumference of the base portion 129, and a temperature sensor (not illustrated) (such as a thermistor) is embedded in the base portion 129, for example. The signal of this temperature sensor is used to perform control to maintain the temperature of the base portion 129 at a constant high temperature (set temperature) by heating with the heater or cooling with the water-cooled tube 149 (hereinafter referred to as TMS (temperature management system)).

Figure 2:
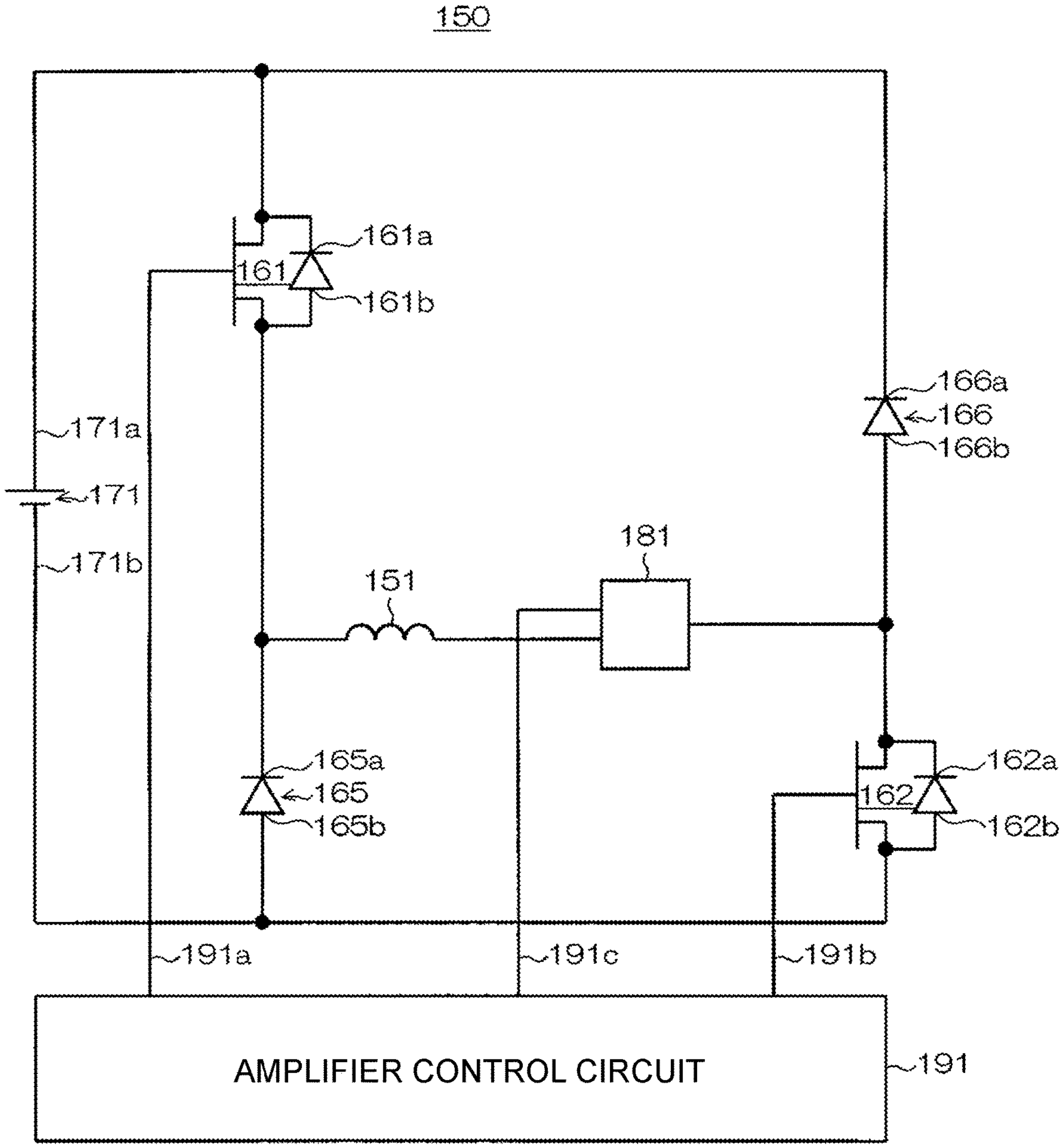
FIG. 2 is a circuit diagram showing an amplifier circuit for controlling and exciting electromagnets of the turbomolecular pump shown in FIG. 1.

The amplifier circuit 150 is now described that controls and excites the upper radial electromagnets 104, the lower radial electromagnets 105, and the axial electromagnets 106A and 106B of the turbomolecular pump 100 configured as described above. FIG. 2 is a circuit diagram of the amplifier circuit 150.

In FIG. 2, one end of an electromagnet winding 151 forming an upper radial electromagnet 104 or the like is connected to a positive electrode 171_a_ of a power supply 171 via a transistor 161, and the other end is connected to a negative electrode 171_b_ of the power supply 171 via a current detection circuit 181 and a transistor 162. Each transistor 161, 162 is what is referred to as a power MOSFET and has a structure in which a diode is connected between the source and the drain thereof.

In the transistor 161, a cathode terminal 161_a_ of its diode is connected to the positive electrode 171_a_, and an anode terminal 161_b_ is connected to one end of the electromagnet winding 151. In the transistor 162, a cathode terminal 162_a_ of its diode is connected to a current detection circuit 181, and an anode terminal 162_b_ is connected to the negative electrode 171_b_.

A diode 165 for current regeneration has a cathode terminal 165_a_ connected to one end of the electromagnet winding 151 and an anode terminal 165_b_ connected to the negative electrode 171_b_. Similarly, a diode 166 for current regeneration has a cathode terminal 166_a_ connected to the positive electrode 171_a_ and an anode terminal 166_b_ connected to the other end of the electromagnet winding 151 via the current detection circuit 181. The current detection circuit 181 may include a Hall current sensor or an electric resistance element, for example.

The amplifier circuit 150 configured as described above corresponds to one electromagnet. Accordingly, when the magnetic bearing uses 5-axis control and has ten electromagnets 104, 105, 106A, and 106B in total, an identical amplifier circuit 150 is configured for each of the electromagnets. These ten amplifier circuits 150 are connected to the power supply 171 in parallel.

An amplifier control circuit 191 may be formed by a digital signal processor portion (not shown, hereinafter referred to as a DSP portion) of the control device 200. The amplifier control circuit 191 switches the transistors 161 and 162 between on and off.

The amplifier control circuit 191 is configured to compare a current value detected by the current detection circuit 181 (a signal reflecting this current value is referred to as a current detection signal 191_c_) with a predetermined current command value. The result of this comparison is used to determine the magnitude of the pulse width (pulse width time Tp1, Tp2) generated in a control cycle Ts, which is one cycle in PWM control. As a result, gate drive signals 191_a_ and 191_b_ having this pulse width are output from the amplifier control circuit 191 to gate terminals of the transistors 161 and 162.

Under certain circumstances such as when the rotational speed of the rotating body 103 reaches a resonance point during acceleration, or when a disturbance occurs during a constant speed operation, the rotating body 103 may require positional control at high speed and with a strong force. For this purpose, a high voltage of about 50 V, for example, is used for the power supply 171 to enable a rapid increase (or decrease) in the current flowing through the electromagnet winding 151. Additionally, a capacitor is generally connected between the positive electrode 171*a* and the negative electrode 171*b* of the power supply 171 to stabilize the power supply 171 (not shown).

In this configuration, when both transistors 161 and 162 are turned on, the current flowing through the electromagnet winding 151 (hereinafter referred to as an electromagnet current iL) increases, and when both are turned off, the electromagnet current iL decreases.

Also, when one of the transistors 161 and 162 is turned on and the other is turned off, a freewheeling current is maintained. Passing the freewheeling current through the amplifier circuit 150 in this manner reduces the hysteresis loss in the amplifier circuit 150, thereby limiting the power consumption of the entire circuit to a low level. Moreover, by controlling the transistors 161 and 162 as described above, high frequency noise, such as harmonics, generated in the turbomolecular pump 100 can be reduced. Furthermore, by measuring this freewheeling current with the current detection circuit 181, the electromagnet current iL flowing through the electromagnet winding 151 can be detected.

Figure 3:
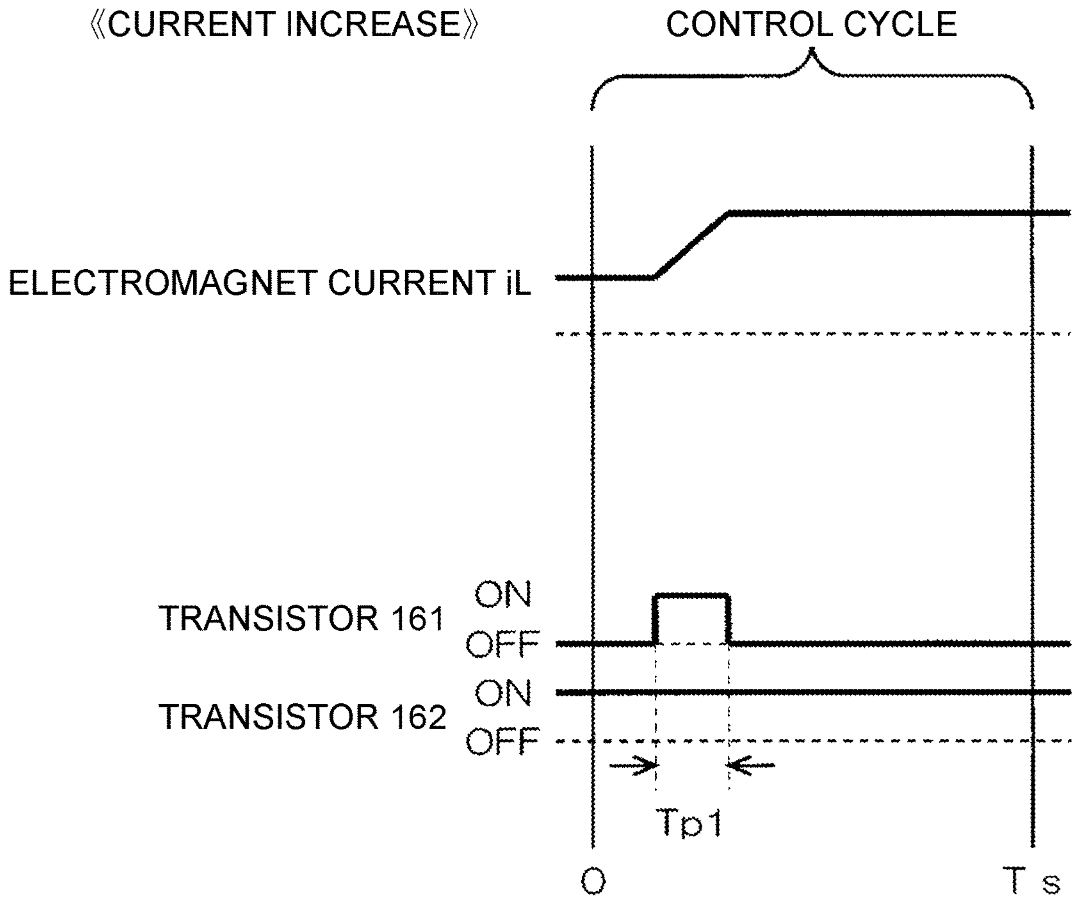
FIG. 3 is a time chart showing control performed when a current command value is greater than a detected value.

That is, when the detected current value is smaller than the current command value, as shown in FIG. 3, the transistors 161 and 162 are simultaneously on only once in the control cycle Ts (for example, 100 μs) for the time corresponding to the pulse width time Tp1. During this time, the electromagnet current iL increases accordingly toward the current value iLmax (not shown) that can be passed from the positive electrode 171*a* to the negative electrode 171*b* via the transistors 161 and 162.

Figure 4:
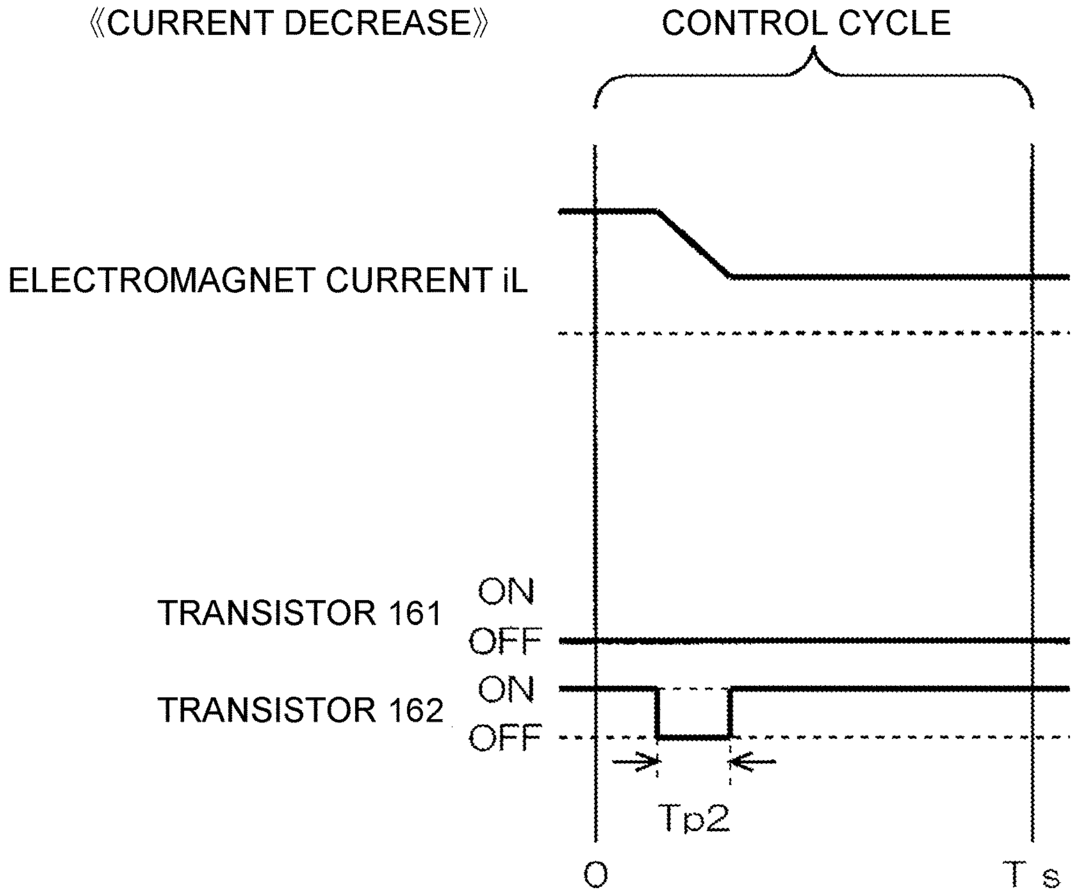
FIG. 4 is a time chart showing control performed when a current command value is less than a detected value.

When the detected current value is larger than the current command value, as shown in FIG. 4, the transistors 161 and 162 are simultaneously off only once in the control cycle Ts for the time corresponding to the pulse width time Tp2. During this time, the electromagnet current iL decreases accordingly toward the current value iLmin (not shown) that can be regenerated from the negative electrode 171*b* to the positive electrode 171*a* via the diodes 165 and 166.

In either case, after the pulse width time Tp1, Tp2 has elapsed, one of the transistors 161 and 162 is on. During this period, the freewheeling current is thus maintained in the amplifier circuit 150.

The turbomolecular pump 100 is configured as described above. This turbomolecular pump 100 is an example of a vacuum pump. Also, in FIG. 1, the rotor blades 102 and the rotating body 103 serve as a rotor of the turbomolecular pump 100, the stator blades 123 and the stator blade spacers 125 serve as a stator portion of the turbomolecular pump portion, and the threaded spacer 131 serves as a stator portion of the threaded spacer pump portion, which is subsequent to the turbomolecular pump portion. Additionally, the inlet port 101, the outlet port 133, the outer cylinder 127, the reference member 301, and the outer cylinder member 302 serve as a casing of the turbomolecular pump 100 and houses the above-described rotor and the above-described plurality of stator portions. That is, the above-described rotor is rotationally held in the above-described casing, and the above-described plurality of stator portions are disposed facing the rotor and have a gas compression function.

Figure 5:
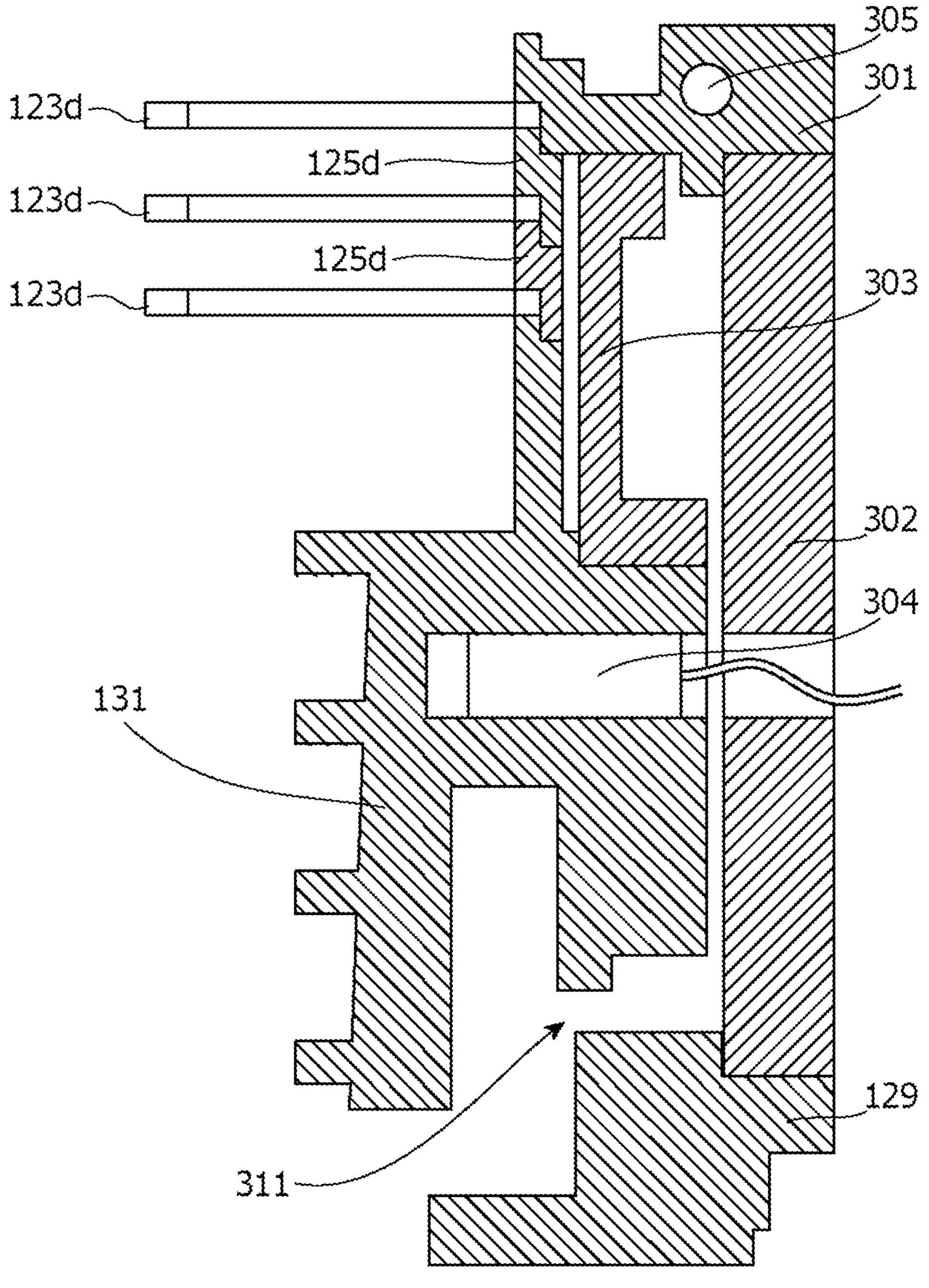
FIG. 5 is a cross-sectional view illustrating a reference member and members positioned according to the reference member in the vacuum pump shown in FIG. 1.

FIG. 5 is a cross-sectional view illustrating the reference member 301 and members positioned according to the reference member 301 in the vacuum pump shown in FIG. 1.

In the vacuum pump shown in FIG. 1, the reference member 301 is one of the members stacked toward the inlet port 101 from the base portion 129 (hereinafter referred to as stacked members), and is an annular member that serves as a reference for the axial positions of the above-described plurality of stator portions. The plurality of stator portions (such as the stator portion of the turbomolecular pump portion and the stator portion of the thread groove pump portion) as described above are arranged at the side of the reference member 301 corresponding to the outlet port 133 and positioned according to the reference member 301 in the axial direction. It should be noted that the plurality of stator portions are not included in the stacked members described above.

In this example, as shown in FIG. 5, stator blades 123*d* and stator blade spacers 125*d* (i.e., the stator portion of the turbomolecular pump portion (a part)) and the threaded spacer 131 (i.e., the stator portion of the thread groove pump portion) are positioned according to the reference member 301 in the axial direction at the exhaust side of the reference member 301. In some examples, an entirety of threaded spacer 131 may be disposed on a downstream side with respect to reference member 301.

Specifically, one end of the stator portion formed by stator blades 123*d* and stator blade spacers 125*d* is in contact with the reference member 301 in the axial direction, and one end of the threaded spacer 131 is in contact with the other end of the stator portion formed by the stator blades 123*d* and the stator blade spacers 125*d* in the axial direction. One end of the annular member 303 is in contact with the reference member 301, and the other end of the annular member 303 is in contact with the threaded spacer 131. Also, the other end of the threaded spacer 131 is not in contact with the base portion 129, and a gap 311 is formed between the threaded spacer 131 and the base portion 129.

In this manner, the stator blades 123*d* and the stator blade spacers 125*d* (i.e., the stator portion of the turbomolecular pump portion (a part)) and the threaded spacer 131 (i.e., the stator portion of the thread groove pump portion) are positioned according to the reference member 301 and not positioned according to the base portion 129. As illustrated in FIG. 5, a reference member 301 may have a first end on an inlet port side and a second end of a downstream side; where one of stator blades 123*d* are positioned on a downstream side; where the second end is disposed on the inlet port side with respect to the third end. In other words, an entirety of a reference member 301 may be positioned on an upper side with respect to a lowermost side of one of stator blades 123*d*.

A heater 304 is provided in the threaded spacer 131, and a cooling pipe 305 is provided in the reference member 301. As such, the heat flowing from the heater 304 into the threaded spacer 131 flows into the reference member 301 from the threaded spacer 131 through the stator blades 123*d* and the stator blade spacers 125*d* (i.e., the stator portion of the turbomolecular pump portion (a part)) and the annular member 303. As a result, in the gas flow passage, the temperature gradually decreases following the order of the threaded spacer 131, the stator portion formed by the stator blades 123*d* and the stator blade spacers 125*d*, and the reference member 301.

Figure 6:
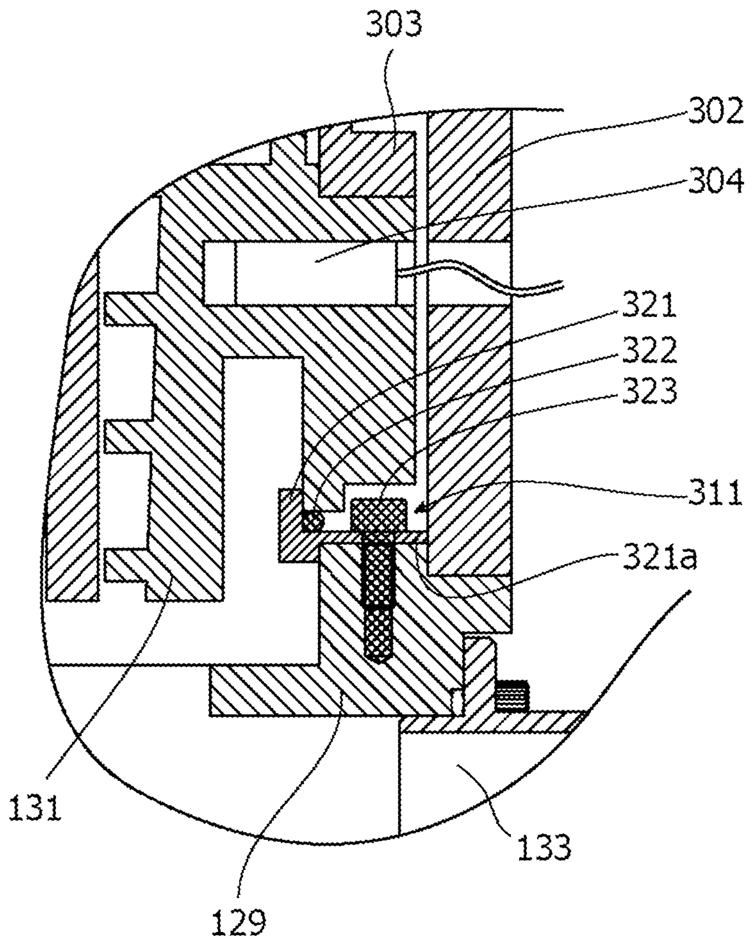
FIG. 6 is a cross-sectional view illustrating a configuration around a gap in a vacuum pump according to a first example.

FIG. 6 is a cross-sectional view illustrating a configuration around a gap 311 in a vacuum pump of a first example.

In the first example, as shown in FIG. 6, a heat insulating member 321 and an elastic member 322 are arranged in the gap 311.

The heat insulating member 321 is an annular member having a thermal conductivity lower than the thermal conductivity of the threaded spacer 131 and the base portion 129, and includes a flange section 321*a*. The flange section 321*a* has a plurality of holes arranged in the circumferential direction. Bolts 323 are inserted in these holes and threadedly joined to the base portion 129, thereby fixing the heat insulating member 321 to the base portion 129.

In this example, the threaded spacer 131 and the base portion 129 are made of aluminum, and the heat insulating member 321 is made of stainless steel, for example.

The outer circumference surface of the heat insulating member 321 is in contact with the inner wall surface of the threaded spacer 131 to position the threaded spacer 131 in the radial direction. As compared to when the vacuum pump is stopped, when the vacuum pump is in operation, the threaded spacer 131 has a higher temperature than the base portion 129 and the heat insulating member 321 and therefore undergoes greater thermal expansion. As such, achieving the radial positioning by bringing the heat insulating member 321 into contact with the inner wall surface of the threaded spacer 131 as described above increases the heat insulating effect.

Figure 7:
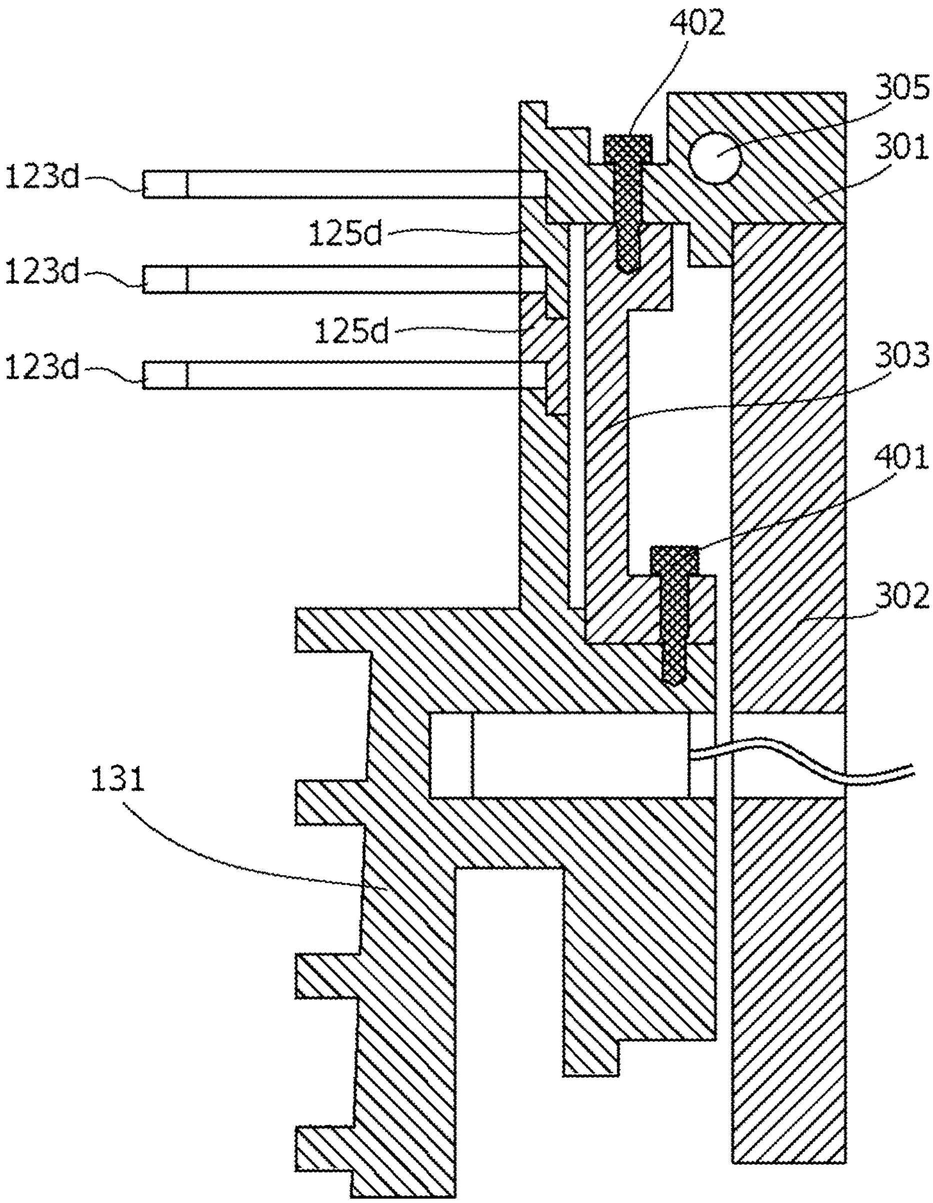
FIG. 7 is a cross-sectional view illustrating an example of the fastening of a reference member and members positioned according to the reference member in the vacuum pump shown in FIG. 1.

FIG. 7 is a cross-sectional view illustrating an example of the fastening of the reference member 301 and the members positioned according to the reference member 301 in the vacuum pump shown in FIG. 1.

In the first example, as shown in FIG. 7, stator blades 123*d* and stator blade spacers 125*d* (i.e., the stator portion of the turbomolecular pump portion (a part)) and the threaded spacer 131 (i.e., the stator portion of the thread groove pump portion) are fixed to the reference member 301 by bolts 401, 402. FIG. 7 shows one bolt 401 and one bolt 402, but a plurality of bolts 401 and 402 are provided at predetermined intervals in the circumferential direction.

Specifically, the bolts 402 directly fix the annular member 303 to the reference member 301, the bolts 401 directly fix the threaded spacer 131 to the annular member 303. The stator blades 123*d* and the stator blade spacers 125*d* (i.e., the stator portion of the turbomolecular pump portion (a part)) are fixed to the reference member 301 so as to be sandwiched between the reference member 301 and the threaded spacer 131.

Figure 8:
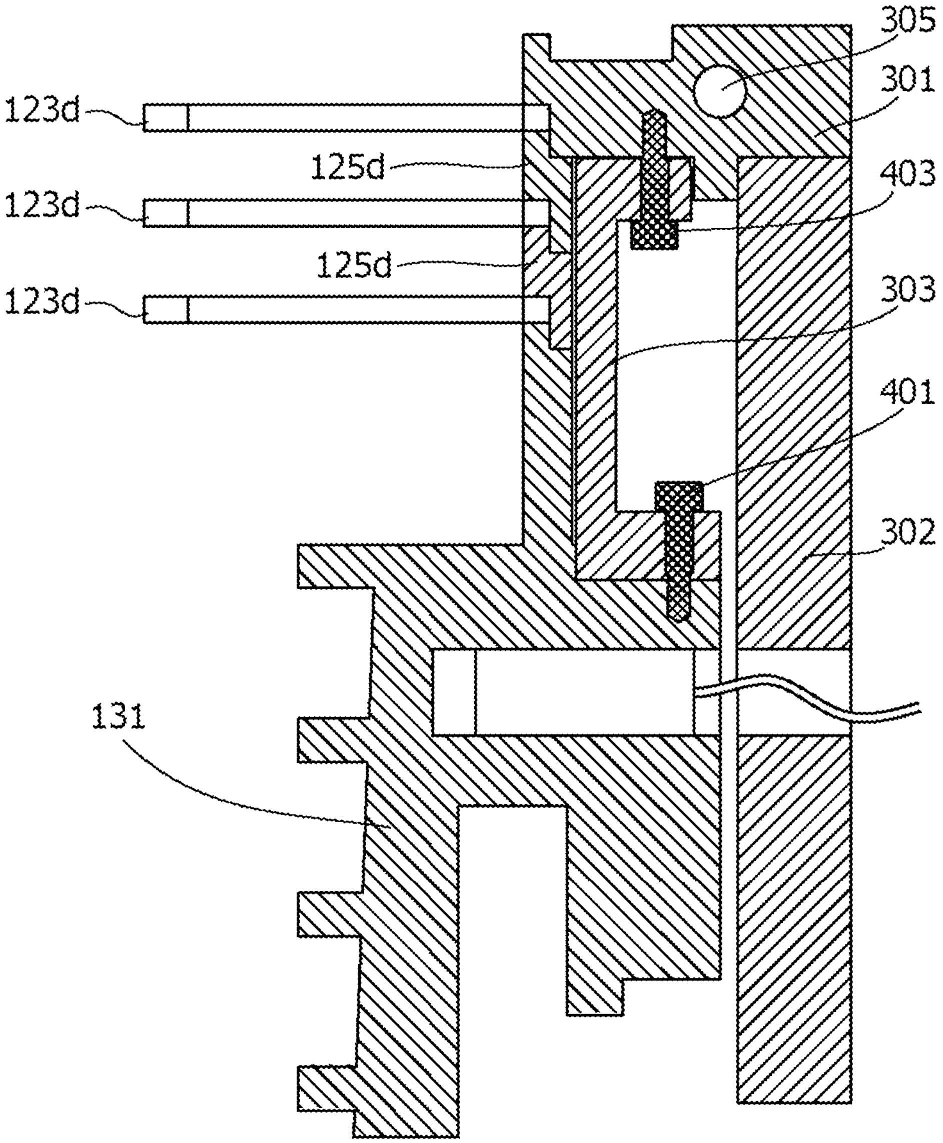
FIG. 8 is a cross-sectional view illustrating another example of the fastening of a reference member and members positioned according to the reference member in the vacuum pump shown in FIG. 1.

FIG. 8 is a cross-sectional view illustrating another example of the fastening of the reference member 301 and the members positioned according to the reference member 301 in the vacuum pump shown in FIG. 1. In FIG. 7, the bolt 402 is inserted through the hole of the reference member 301 so that the bolt 402 and the annular member 303 are threadedly joined by the bolt 402. Instead, as shown in FIG. 8, a bolt 403 may be inserted in a hole of the annular member 303 so that the bolt 403 and the reference member 301 may be threadedly joined by the bolt 403.

Returning to FIG. 6, the elastic member 322 is a member that expands and contracts in the axial direction. In this example, one end of the elastic member 322 is in contact with the threaded spacer 131, while the other end of the elastic member 322 is in contact with the heat insulating member 321. When the heat insulating member 321 is omitted, the other end of the elastic member 322 is in contact with the base portion 129.

In the first example, the elastic member 322 is an O-ring.

A temperature sensor (not shown) is provided on at least one of the reference member 301 and the outer cylinder member 302. The control device 200 uses this temperature sensor to measure the temperature of the location in which the temperature sensor is placed, and adjusts, based on this temperature, the amount of heat generated by the heater 304 and/or the flow rate of the coolant (water in this example) in the cooling pipe 305 to perform control so that the temperature of one or both of the reference member 301 and the outer cylinder member 302 is a predetermined temperature. As a result, at least one of the reference member 301 and the outer cylinder member 302 serves as a low temperature source, and temperature changes in the outer cylinder member 302 (and the reference member 301) are reduced during operation. Thus, the outer cylinder member 302 (and the reference member 301) resists thermal expansion, and the accuracy of the axial positions of the portions including the above-described stacked members is less likely to decrease.

The operation of the vacuum pump according to the first example is now described.

When the vacuum pump is in operation, the motor 121 operates to rotate the rotor under the control of the control device 200. As a result, the gas that has flowed in through the inlet port 101 is transferred along the gas flow passage between the rotor and the stator portions, and is discharged from the outlet port 133 to the external piping.

During operation of the vacuum pump, the control device 200 controls the heater 304 and the coolant flow rate of the cooling pipe 305 to control the temperature. At this time, heat flows from the threaded spacer 131, in which heater 304 is installed, to the reference member 301 through the stator blades 123*d*, the stator blade spacers 125*d*, and the annular member 303.

Accordingly, the temperature distribution is appropriately set along the flow passage. That is, since the temperature gradually increases toward the exhaust side, where the pressure is high, the temperature that may limit deposits is secured while limiting unnecessary heating by the heater 304 in each location in the flow passage.

As described above, according to the first example, in the vacuum pump, the reference member 301 is one of the members stacked toward the inlet port 101 from the base portion 129, and is an annular member serving as the reference for the axial positions of the plurality of stator portions (stator blades 123*d* and stator blade spacers 125*d* (i.e., the stator portion of the turbomolecular pump portion) and the threaded spacer 131 (i.e., the stator portion of the thread groove pump portion)), which have a gas compression function. The plurality of stator portions are disposed downstream of the reference member 301 (the side corresponding to the outlet port 133).

Thus, the temperature distribution in the flow passage is easily adjusted to an appropriate temperature distribution, and the heat dissipation (cooling) of the prior pump portion (the turbomolecular pump portion in this example) and the heating of the latter pump portion (the thread groove pump portion in this example) are both appropriately achieved. As a result, a satisfactory permissible flow rate can be obtained while liming accumulation of deposits.

Second Example

Figure 9:
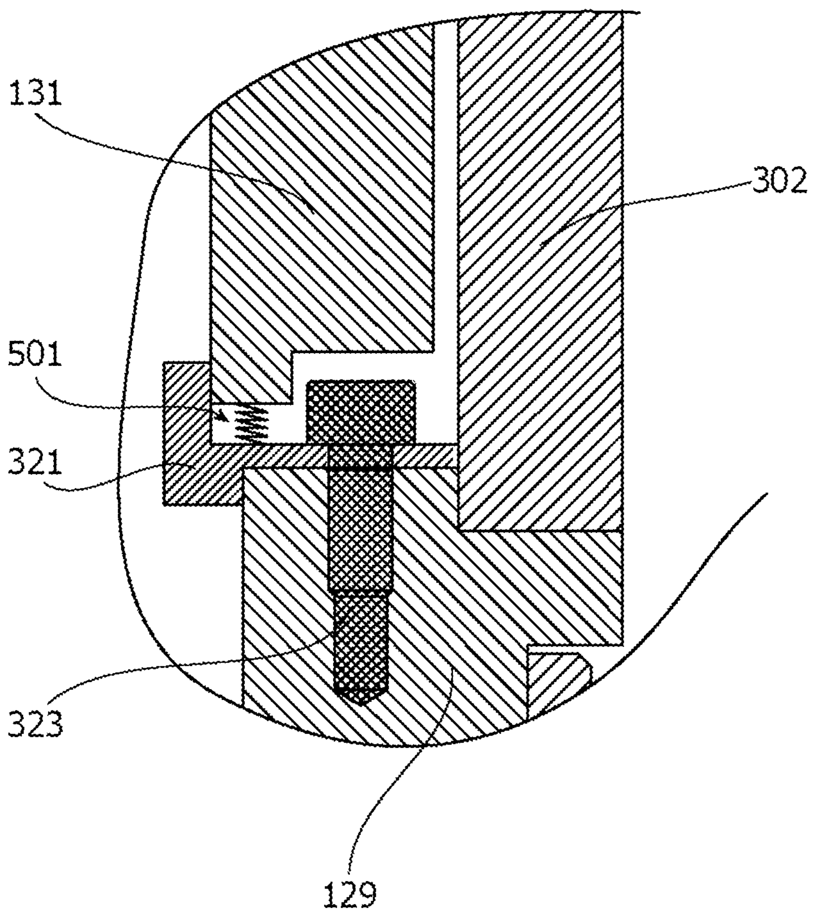
FIG. 9 is a cross-sectional view illustrating a configuration around a gap in a vacuum pump of a second example.

FIG. 9 is a cross-sectional view illustrating a configuration around a gap 311 in a vacuum pump of a second example.

As shown in FIG. 9, the second example uses an elastic member 501 in place of the elastic member 322 (O-ring) described above. The elastic member 501 is a spring. A plurality of elastic members 501 are provided at predetermined intervals in the circumferential direction.

Since the other configurations and operations of the vacuum pump according to the second example are the same as those of the first example, the description thereof is omitted.

Third Example

Figure 10:
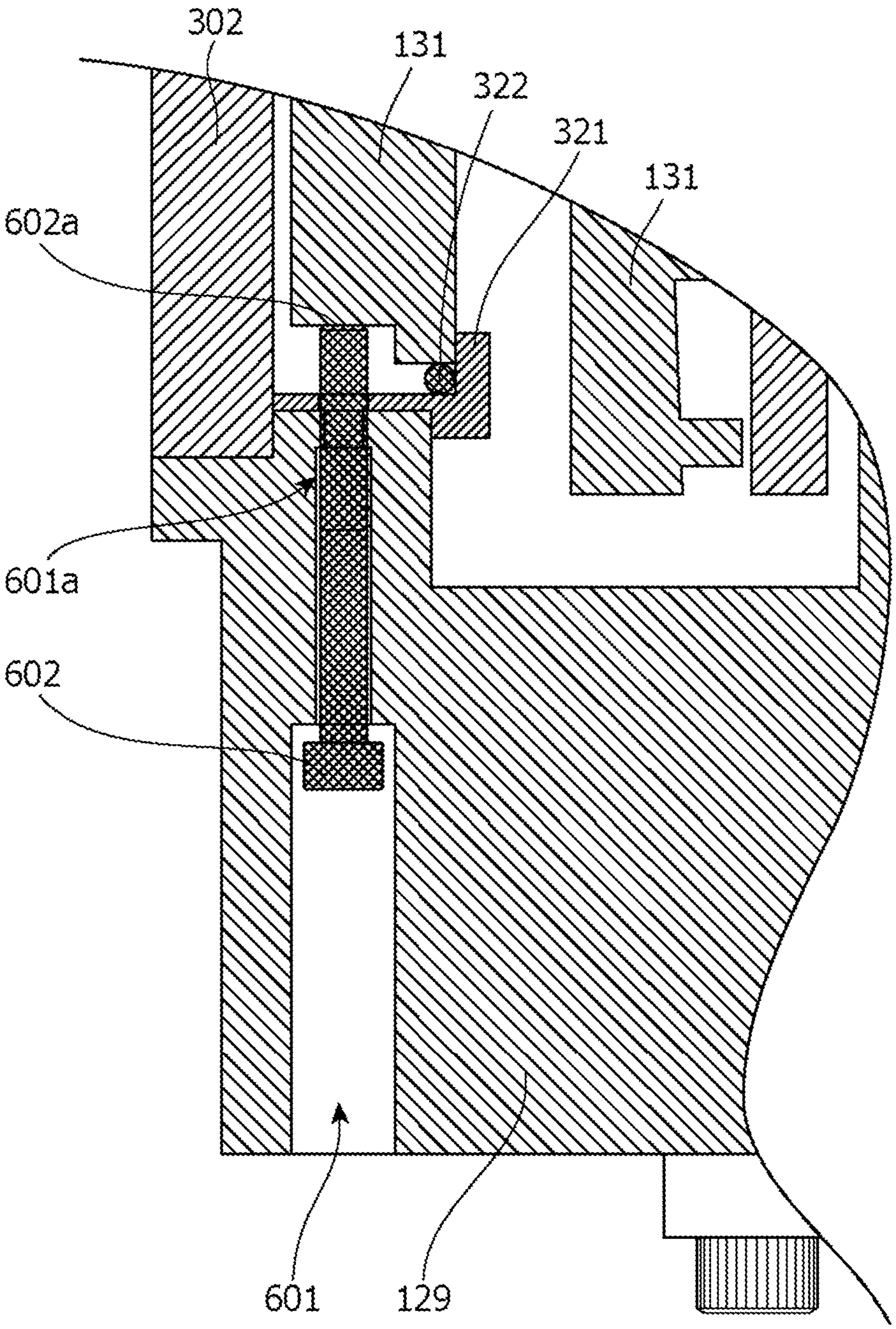
FIG. 10 is a cross-sectional view illustrating a configuration around a gap in a vacuum pump of a third example.

FIG. 10 is a cross-sectional view illustrating a configuration around a gap 311 in a vacuum pump of a third example.

In the third example, the base portion 129 has a hole 601 extending in the axial direction. An internal thread 601*a*, which corresponds to the external thread of a bolt 602, is formed in the hole 601. The external thread of the bolt 602 is threadedly joined to the internal thread 601*a*. Rotating the bolt 602 advances or retracts a distal end flat surface 602*a* of the bolt 602 in the axial direction. This allows the distal end flat surface 602*a* of the bolt 602 to be in contact with the base surface of the threaded spacer 131.

In this manner, the bolt 602 is fixed to the base portion 129 and pushes the threaded spacer 131 toward the reference member 301 at its distal end flat surface 602*a*. Accordingly, the threaded spacer 131 is pressed against the stator portion of the turbomolecular pump (the stator blades 123*d* and the stator blade spacers 125*d*) and the annular member 303, and the stator portion of the turbomolecular pump (the stator blades 123*d* and the stator blade spacers 125*d*) and the annular member 303 are pressed against the reference member 301.

As a result, the stator portion of the turbomolecular pump (the stator blades 123*d* and the stator blade spacers 125*d*) and the threaded spacer 131 are pressed such that the stator portion of the turbomolecular pump (the stator blades 123*d* and the stator blade spacers 125*d*) is fixed in contact with the reference member 301 and that the threaded spacer 131 is fixed in contact with the stator portion of the turbomolecular pump (the stator blades 123*d* and the stator blade spacers 125*d*). Thus, the stator portion of the turbomolecular pump (the stator blades 123*d* and the stator blade spacers 125*d*) and the threaded spacer 131 are positioned according to the reference member 301. As such, the bolts 401, 402, and 403 described above do not have to be provided in the third example. A plurality of bolts 602 (and holes 601) are provided at predetermined intervals in the circumferential direction at positions that do not interfere with the bolts 323 described above.

Since the other configurations and operations of the vacuum pump according to the third example are the same as those of the first and second examples, the description thereof is omitted.

Various alterations and modifications to the above-described examples will be apparent to those skilled in the art. Such alterations and modifications may be made without departing from the spirit and scope of the subject matter and without compromising the intended advantages. That is, such alterations and modifications are intended to be within the scope of the claims.

For example, in the first, second, and third examples described above, the above-described plurality of stator portions are mutually different types of stator portions and include at least two types of stator portions among a turbomolecular pump, a Holweck type pump (thread groove pump), and a Siegbahn type pump. That is, in the first, second, and third examples described above, a Siegbahn type pump may be added, or a Siegbahn type pump may be used in place of the turbomolecular pump or the Holweck type pump (thread groove pump). Also, other types of pumps (for example, a pump that is described in WO2013/110936 and in which perforated discs and helical vanes are relatively rotated) may be used in place of any of the turbomolecular pump, Holweck type pump (thread groove pump), and Siegbahn type pump, or other types of pumps may be added.

In the first, second, and third examples, the cooling pipe 305 is provided in the reference member 301. Instead, the cooling pipe 305 (and the above-described temperature sensor) may be provided in the outer cylinder 302, which is connected to the reference member 301.

In the first, second, and third examples, the reference member 301 is connected to the base portion 129 through the outer cylinder 302 as described above. However, the outer cylinder 302 may be omitted, and the reference member 301 may be formed as a single member having the shape of the outer cylinder 302, directly connected to the base portion 129, and temperature controlled in the same manner. That is, the reference member 301 may be directly connected to the base portion 129 and temperature controlled.

The invention claimed is:

1. A vacuum pump comprising:

a casing including an inlet port;

a base portion;

a rotor rotationally held in the casing;

a plurality of stator portions that are disposed facing the rotor and have a gas compression function; and an annular body that is one of members stacked toward the inlet port from the base portion, the annular body being for positioning the plurality of stator portions as a reference in an axial direction for the plurality of stator portions, wherein the plurality of stator portions include a plurality of stator blades of a turbomolecular pump portion, a plurality of stator blade spacers of the turbomolecular pump portion, and one threaded spacer of a threaded spacer pump portion, an entirety of the one threaded spacer is disposed on a downstream side with respect to the annular body, the annular body has a cooling pipe, and one stator portion of the plurality of stator portions that is positioned on the downstream side has a heater, and the entirety of the annular body is disposed on a side of the inlet port that is upstream relative to the stator blade positioned furthest downstream among the plurality of stator blades.

2. The vacuum pump according to claim 1, further comprising a gap between the one stator portion of the plurality of stator portions and the base portion.

3. The vacuum pump according to claim 2, further comprising a heat insulator in the gap.

4. The vacuum pump according to claim 3, wherein the heat insulator is in contact with an inner wall surface of the one stator portion of the plurality of stator portions to position the one stator portion in a radial direction.

5. The vacuum pump according to claim 1, wherein the plurality of stator portions are fixed to the annular body using a plurality of bolts.

6. The vacuum pump according to claim 2, further comprising an elastic member in the gap.

7. The vacuum pump according to claim 6, wherein the elastic member is an O-ring.

8. The vacuum pump according to claim 1, further comprising a bolt that is fixed to the base portion and presses the one stator portion of the plurality of stator portions toward the annular body.

9. The vacuum pump according to claim 1, further comprising:

an outer cylinder member connected to the base portion, wherein the annular body is connected to the outer cylinder member, and at least one of the annular body and the outer cylinder member is temperature controlled.

10. The vacuum pump according to claim 1, wherein heat flows into the annular body from the plurality of stator portions.

11. The vacuum pump according to claim 1, wherein an axial gap is provided between the stator portion having the heater and the base portion.

* * * * *